H. H. C. ARNOLD.
Animal-Traps.

No. 145,082.

Patented Dec. 2, 1873.

UNITED STATES PATENT OFFICE.

HUDSON H. C. ARNOLD, OF NICHOLASVILLE, KENTUCKY.

IMPROVEMENT IN ANIMAL-TRAPS.

Specification forming part of Letters Patent No. 145,082, dated December 2, 1873; application filed October 25, 1873.

*To all whom it may concern:*

Figure 1:
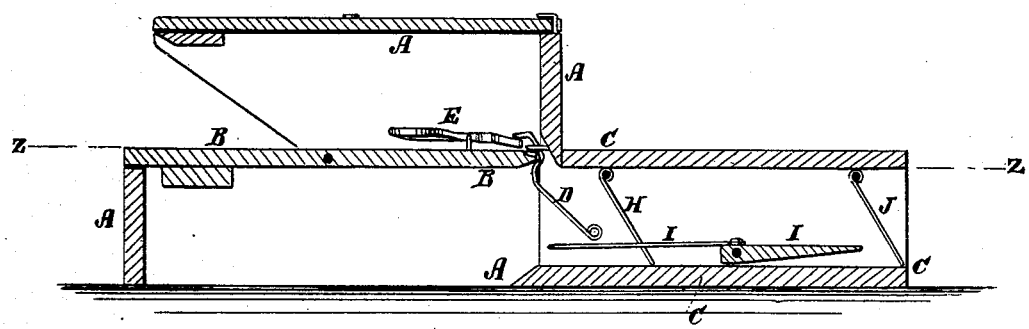
Figure 2:
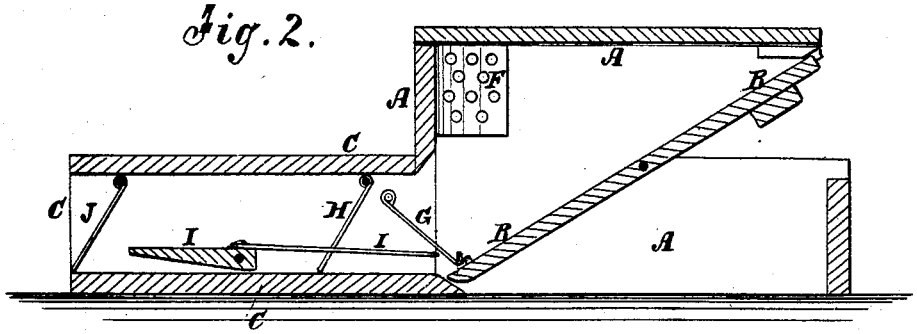
Figure 3:
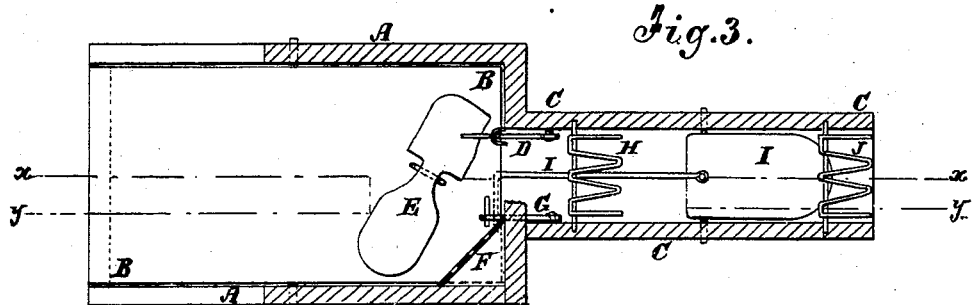

Be it known that I, HUDSON H. C. ARNOLD, of Nicholasville, in the county of Jessamine and State of Kentucky, have invented a new and useful Improvement in Animal-Trap, of which the following is a specification:

Figure 1 is a vertical longitudinal section of my improved trap taken through the line $x$ $x$, Fig. 3. Fig. 2 is a vertical longitudinal section of my improved trap taken through the line $y$ $y$ of Fig. 3, and looking in the reverse direction from the section shown in Fig. 1. Fig. 3 is a horizontal section of the same taken through the line $z$ $z$, Fig. 1.

Similar letters of reference indicate corresponding parts.

My invention has for its object to furnish an improved animal-trap, simple in construction, inexpensive in manufacture, and reliable and effective in use.

The invention consists in the combination of the trip-board, the catch, and the platform-lever with the box and chute; and in the combination of the catch-rod, the lever, and the two hanging gates with the trip-board, the box, and the chute, as hereinafter fully described.

A is the box of the trap, which is divided into two parts by a horizontal trip-board, B, which is pivoted, at or near its middle part, to the sides of the said box A. The outer or rear end of the lower part of the box A is closed, and in its forward part is a hole of suitable size, leading into the chute or passage-way C. The rear end of the upper part of the box A is left open, and its sides are partially cut away to form a large opening for the animal to enter upon the trip-board or tilting platform B, and to remove his fear by apparently offering an unobstructed retreat if he should become suspicious of danger. The trip-board B is held in a horizontal position by a catch, D, which is pivoted in the rear part of the chute C, and takes hold of the forward edge of the said board B, as shown in Fig. 1. The end of the catch D projects above the forward end of the lever-platform E, the rear end of which projects into such a position that the animal must step upon it when he attempts to reach the bait-box F secured in the inner end of the box A. As the animal steps upon the rear end of the lever E, it disengages the catch D, and the weight of the animal causes the forward end of the trip-board to drop, when it is caught and held by the catch-rod G. The forward end of the catch-rod G is pivoted in the rear part of the chute C, and its rear part rests upon the forward edge of the trip-board B, so that, as the forward end of the said trip-board drops, the free end of the said catch-rod may catch upon a stop attached to the said trip-board B, as shown in Fig. 2. As the animal drops into the chute C he raises the pivoted wire gate H, which hangs in an inclined position, and enters the middle part of said chute, the gate H dropping behind him, and preventing his return. The animal now sees light before him, and, passing toward it, he steps upon the lever I, the rear end of which, or a rod attached to it, extends back to the catch-rod G, so that the weight of the animal stepping upon said lever may disengage the catch-rod G, and allow it (the trip-board B) to again take a horizontal position, where it is caught and held by the catch D, as hereinbefore described, and the trap is again set. As the animal comes to the forward end of the chute C, he raises the hanging wire gate J, and passes out, the gate J dropping behind him, and preventing his return.

A cage or some other convenient receptacle should be connected with the end of the chute C to receive the animal.

The chute C should be of such a length that the noise and scent of the caught animals may not frighten off other animals that may approach the trap.

Having thus described my invention, I claim as new and desire to secure by Letters Patent—

1. The combination of the trip-board B, catch D, and platform-lever E with the box A and chute C, when constructed and arranged substantially as herein shown and described.

2. The combination of the catch-rod G, lever I, and two hanging gates, H J, with the trip-board B, box A, and chute C, substantially as herein shown and described.

HUDSON H. C. ARNOLD.

Witnesses:
W. A. LOGAN,
J. W. ARNOLD.